(12) United States Patent
Neben et al.

(10) Patent No.: US 6,407,696 B1
(45) Date of Patent: Jun. 18, 2002

(54) RADAR SENSOR OPTIMIZATION SYSTEM

(75) Inventors: Sean Ernest Neben, Lexington, NE (US); Ronald Melvin Taylor, Grreentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/570,691

(22) Filed: May 12, 2000

(51) Int. Cl.[7] .................................................. G01S 7/40
(52) U.S. Cl. ........................... 342/70; 342/165; 342/174
(58) Field of Search ................................. 342/165, 166, 342/167, 168, 169, 170, 171, 172, 173, 174, 70

(56) References Cited

U.S. PATENT DOCUMENTS 5,841,393 A * 11/1998 Saito et al. ................. 342/165
5,999,120 A * 12/1999 Yamada ...................... 342/174
6,278,399 B1 * 8/2001 Ashihara .................... 342/173

* cited by examiner

Primary Examiner—John B. Sotomayor
(74) Attorney, Agent, or Firm—Jimmy L. Funke

(57) ABSTRACT

A method for optimizing the sensitivity of certain radar sensors that works by placing target objects within a sensor's field of coverage at strategic locations and adjusting the sensor's radar parameters as a function of the sensor target location and performance characteristics of the sensor, including bin resolution and spatial constraints. The proposed methods are ideally suited for a wide variety of uses, including for use on production lines. The methods are equally appropriate for use in other areas, including sensor maintenance and recalibration and in the development and validation of sensors.

16 Claims, 2 Drawing Sheets

RADAR SENSOR OPTIMIZATION SYSTEM

TECHNICAL FIELD

The present invention relates generally to radar systems, and more specifically, to radar sensor optimization systems.

BACKGROUND OF THE INVENTION

Warning systems are being used today to alert vehicle operators of objects that may be a collision hazard. Warning systems are typically used as aids in precise parking maneuvers or while vehicles are backing up. Warning systems are desirable to minimize or avoid vehicle damage that may otherwise occur. Conventional warning systems use radar emitter/sensor systems to scan fields of coverage for objects that may be a collision hazard.

Most radar systems are threshold-type detection systems. These types of radar systems use a minimum signal target (for example, a 1-meter high, 75-mm diameter PVC pipe) as a threshold to assess the sensor's inherent capability by placing those target objects at representative positions in the field. By placing these targets at the edge of the detection field, fewer target objects are needed. In addition, these types of radar systems are typically designed to minimize $R^4$ range losses over all of the range bins by amplifying the signal by an incremental amount so that each effective range bin signal is essentially the same. In this way, the farthest range bin is just as sensitive as a range bin closer to the sensor.

To be used on a vehicle, a radar sensor must be adjusted based on a number of characteristics, including mounting location. The sensitivity of certain radar sensors can be adjusted by either regulating the voltage threshold of the return signal or by regulating the integration time of each dwell (or range bin). Because of the significant variation in the signal quality of radar sensors from one vehicle's mounting configuration to another, each radar sensor must be individually adjusted. Current tuning processes are inefficient, tedious and time consuming.

SUMMARY OF THE INVENTION

It is highly desirable to create an automated method for optimizing radar sensors. The present invention creates several methods for optimizing the sensors in an efficient manner.

The present invention operates by placing target objects in a sensor's field of coverage at strategic locations and adjusting the radar sensor's parameters based on the target objects. Three preferred methods are used to optimize the radar sensors. The first method for optimizing sensors is accomplished by the placement of objects within the target area as a function of high bin resolution with no spatial constraints. The second method for optimizing sensors is accomplished by the placement of the objects within a target area as a function of low bin resolution with no spatial constraints. The third method of optimizing sensors is by the placement of objects within the target area with either low or high bin resolution as a function of spatial constraints.

In one embodiment, where the target area is a function of high bin resolution and no spatial constraints, a coverage area is defined for the sensor. The coverage area is divided into a series of bins, wherein each bin defines an equal portion of said coverage area at varying distances from the sensor. A target object is placed within each of the bins at a predetermined distance from the sensor. The sensor is then adjusted so that each target object is sensed by the sensor at the edge of a detection area for the sensor within each bin.

In a second embodiment, where the target area is a function of low bin resolution and no spatial constraints, a coverage area is defined for the sensor. The coverage area is divided into a series of bins, wherein each bin defines an equal portion of said coverage area at varying distances from the sensor. A target object is placed within every other of the bins at a predetermined distance from the sensor. The sensor is then adjusted so that each target object is sensed by the sensor at the edge of a detection area for the sensor within every other bin. The process is then repeated with the unused bins.

In a third embodiment, where the target area is a function of high or low bin resolution with spatial constraints, a coverage area is defined for the sensor. The coverage area is divided into a series of bins, wherein each bin defines an equal portion of said coverage area at varying distances from the sensor. A target object is placed within the furthest of the bins (away from the sensor) at a predetermined distance from the sensor. The object is then moved iteratively towards the sensor by either moving the target object or the sensor relative to each other. The sensor is then adjusted so that each target object is sensed by the sensor at the edge of a detection area for the sensor within each bin.

The methods disclosed may also be used for sensor maintenance and re-calibration, as well as for quickly and effectively administering tests for development and validation purposes.

BRIEF DESCRIPTION OF THE DRAWINGS

The present invention will now be described, by way of examples, with reference to the accompanying drawings, in which.

DESCRIPTION OF THE PREFERRED EMBODIMENT

Figure 1:
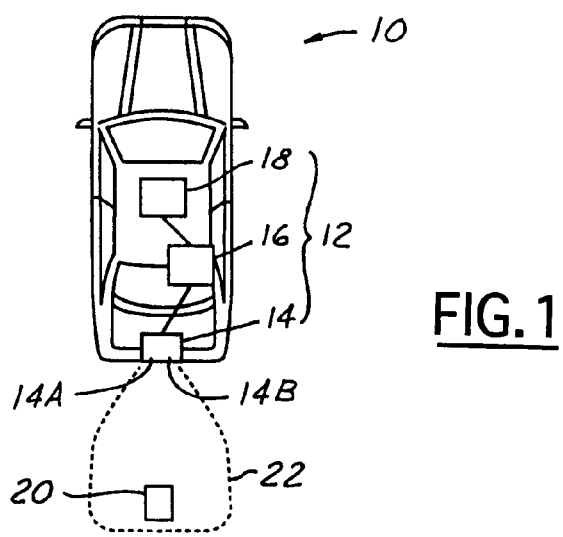
FIG. 1 shows an embodiment of a radar system for use with the present inventive method.

Referring to FIG. 1, a vehicle 10 is shown having a radar system 12. The radar systems 12 is conventional and may comprise one or more emitter/sensors 14A, 14B that are mounted proximate to the bumper system, although the packaging and mounting system may vary greatly from vehicle to vehicle. The radar system 12 further comprises an electronic control module 16 that is electronically coupled to the emitter/sensors 14 and a driver alert display 18.

To operate the radar system 12, first a signal is sent out from the emitter 14A in a specific coverage area 22 to sweep for objects 20. The signal will reflect off of a detected object 20 within the coverage area 22 and be received by the sensor 14B. The mechanism for sending and receiving signals from emitters 14A and sensors 14B is well known in the art. The sensor 14B may then send a signal to a control module 16. The returned signals are then processed by the electronic control module 16, preferably a microprocessor-based control module, to determine the distance between the object 20 and the vehicle 10. The electronic control module 16 then sends a signal to the driver alert display 24, which processes the signal to warn the operator of the vehicle 10 of an impending collision.

The sensitivity of the radar sensors 14B is a function of the voltage threshold of the return signal, the integration time of each dwell (or range bin), and the location of the sensor 14B on the vehicle. Because the sensor 14B location is typically fixed, the sensitivity of radar sensors 14B may be adjusted by either regulating the voltage threshold of the return signal or changing the integration time of each dwell.

The voltage threshold represents the minimum integration value of a target signal that will indicate a target object 20 has been detected. A voltage value below this threshold value is considered noise or clutter. The voltage threshold analysis is on a per sweep basis and is independent of the individual range bin settings as discussed below. The higher the threshold value set, the less sensitive the radar will appear to be. Conversely, the lower the threshold value set, the more sensitive the radar will appear to be. The threshold voltages are typically in the millivolt range.

Bins, or range zones, are distinct areas or regions that the sensor equipment scans for objects 20. The number and size of bins varies from one configuration of sensing equipment to the next. For example, one sensor may have a bin size of 29 cm in length and have 15 different bins that are capable of being scanned. Bin resolution is the ability of the sensors 14B to accurately sense target objects 20 within each bin. The integration time is the amount of time that each range bin is allowed to accumulate signal. The longer the time interval of each range bin, the more sensitive the radar sensor 14B is up to its design limit. Conversely, the shorter the time interval of each range bin, the less sensitive the radar sensor 14B will appear to be. Integration times are typically in the microsecond range.

However, even though the location of the sensor 14B is fixed, there is significant variation in the signal of the sensor 14B from one mounting configuration to another. As such, each individual sensor 14B on each vehicle 10 must be individually adjusted for accuracy. This is a tedious and time-consuming process.

The present invention creates an easy, automated procedure for optimizing sensors 14B in a time efficient manner. The procedure controls the placement of objects in a target area in three distinct ways as a function of bin resolution and spatial constraints. Bin resolution is the ability of the sensors 14B to accurately sense target objects 20 within each bin. Bin resolution is a function of various practical factors, including the accuracy and differentiating ability of the sensing equipment 14B and the processing ability of the control module 22. The higher the bin resolution, the better the ability of the sensor 14B to place a sensed target 20 within a specific bin. For low bin resolution systems, there may be some overlap between adjacent bins. Spatial constraints are defined as the area that the sensors 14B will be limited to in scanning for targets 20.

The first method for optimizing sensors 14B is accomplished by the placement of objects 20 within the target area as a function of high bin resolution with no spatial constraints. The second method for optimizing sensors 14B is accomplished by the placement of the objects 20 within a target area as a function of low bin resolution with no spatial constraints. The third method of optimizing sensors 14B is by the placement of objects 20 within the target area with either low or high bin resolution as a function of spatial constraints. Each method is described in detail below.

Figure 2:
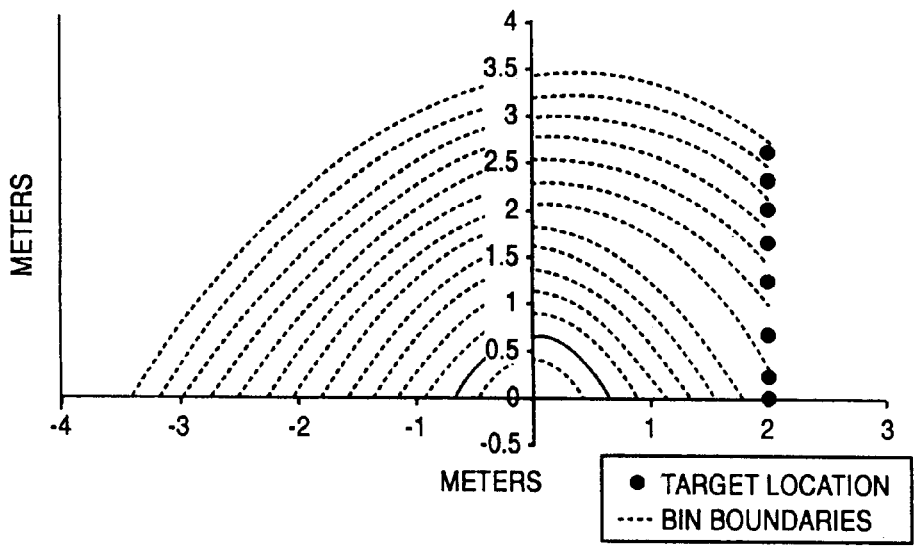
FIG. 2 is an optimization graph showing preferred target locations according to one embodiment of the present invention.

Referring now to FIG. 2, a diagram is shown according to the first embodiment of the invention wherein the sensors are optimized as a function of high bin resolution and no spatial constraints. In this method, targets 20 are first placed at the edge of the desired coverage area at a radial distance equal to the center of each bin. In the example of FIG. 2, the boundary is set for a coverage area width of 2 meters on each side, however, the coverage area width may be of any size. Given these parameters, the sensor 14B is then calibrated by the electronic control module 16 to prevent the occurrence of any false alarms from the material the sensor 14B may need to see through. Then, the electronic control module 16 adjusts either the voltage threshold of the return signal or the integration time of each dwell (or range bin), or both, so that the target 20 is at the threshold of detection or no detection.

This embodiment of the present invention is a threshold type detection system that also is range optimized via an antenna detection pattern that is an inherent part of the hardware design of the radar system 12. Because of this feature, and because of the fact that this embodiment has high bin resolution, the assessment of the detection area can be more easily accomplished by assessing the edge of each range bin field. If the target object 20 is just inside the detection field, target objects 20 will be detected by the sensor 14B. If the target object 20 is outside the detection field, the sensor 14B will not detect target objects 20. In this way, the detection field will be properly defined, which is preferred to reduce false alarms.

While FIG. 2 diagrams an arrangement showing one sensor 14B, it is contemplated that the present invention may be used with more than one sensor 14B. For example, if the system had two sensors 14B, the optimization method described above would be required for each sensor.

Figure 3:
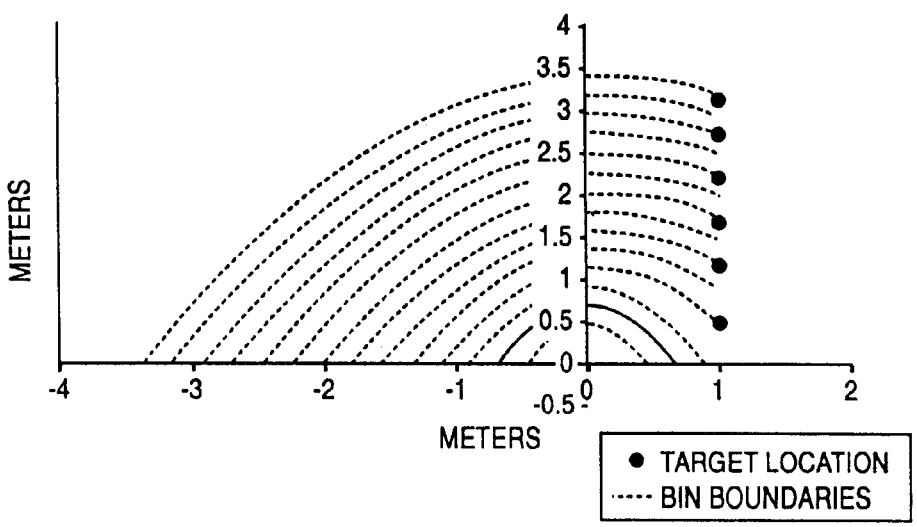
FIG. 3 is an optimization graph showing preferred target locations according to a second embodiment of the present invention.

Referring now to FIG. 3, a diagram is shown wherein the sensors are optimized as a function of low bin resolution and no spatial constraints according to another preferred embodiment of the present invention. Targets 20 are placed at the edge of the desired coverage area at a radial distance equal to the center of every other bin. In the example of FIG. 3, the boundary was set for a coverage area width of 2 meters on each side, however, the coverage area width may be of any size. Given these parameters, the sensors 14B are calibrated to prevent the occurrence of any false alarms from the material the sensor 14B may need to see through. Then, the electronic control module 16 adjusts the voltage threshold of the return signal or the integration time of each dwell (or range bin), or both, so that the target 20 is at the threshold of detection or no detection. The process as described above is done twice, once for even numbered bins and once for odd numbered bins.

This embodiment of the present invention is a threshold type detection system that also is range optimized via an antenna detection pattern that is an inherent part of the hardware design of the radar system 12. Because of this feature, and because of the fact that this embodiment has low bin resolution wherein the process is done twice for even numbered bins and odd numbered bins, the assessment of the detection area can be more easily accomplished by assessing the edge of each range bin field. If the target object 20 is just inside the detection field, targets objects 20 will be detected by the sensor 14B. If the target object 20 is outside the detection field, the sensor 14B will not detect target objects 20. In this way, the detection field will be properly defined, which is crucial to reducing false alarms.

While FIG. 3 diagrams an arrangement showing one sensor 14B, it is contemplated that the present invention may be used with more than one sensor 14B. For example, if the system had two sensors 14B, the optimization method described above would be required for each sensor.

Figure 4:
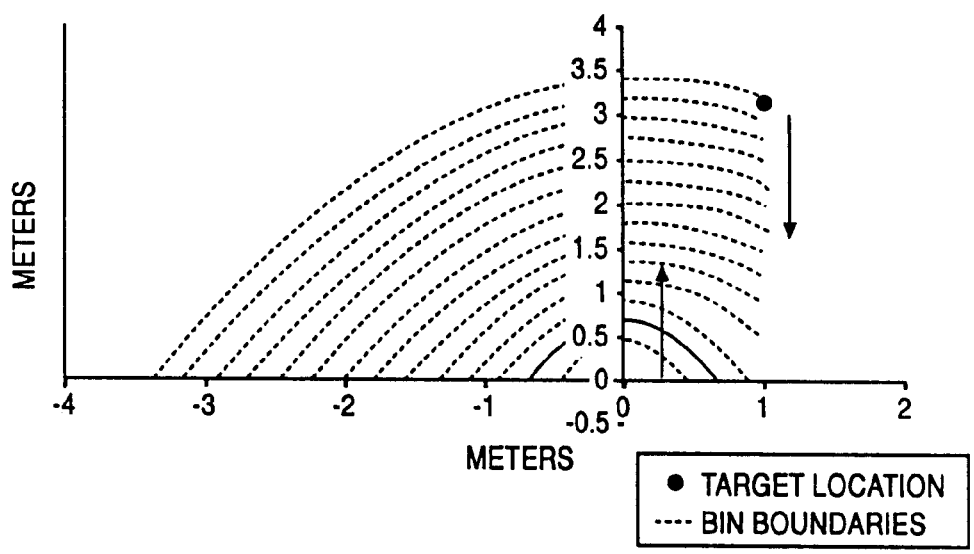
FIG. 4 is an optimization graph showing preferred target locations according to a third embodiment of the present invention.

Referring now to FIG. 4, a diagram is shown wherein the sensors are optimized as a function of low or high bin resolution and as a function of spatial constraints according to a third preferred embodiment of the present invention. One target object 20 is placed at the edge of the desired coverage area at a radial distance equal to the center of one bin. In the example of FIG. 4, the boundary was set for a coverage area width of 2 meters on each side, however, the coverage area width may be of any size. Then, either the target object 20 or the vehicle 10 containing the sensor 14B is moved relative to each other to a position at the edge of the desired coverage area at a radial distance equal to the center of the next adjacent bin. The process is repeated for each adjacent bin. Given these parameters, the sensor 14B is calibrated to prevent the occurrence of any false alarms from the material the sensor 14B may need to see through. Then, the electronic control module 16 adjusts the voltage threshold of the return signal or the integration time of each dwell (or range bin), or both, so that the target object 20 is at the threshold of detection or no detection within each bin.

This embodiment of the present invention is a threshold type detection system that also is range optimized via an antenna detection pattern that is an inherent part of the hardware design of the radar system 12. Because of this feature, and because of the fact that this embodiment has either low or high bin resolution with spatial constraints, the assessment of the detection area can be more easily accomplished by assessing the edge of each range bin field. If the target object 20 is just inside the detection field, targets objects 20 will be detected by the sensor 14B. If the target object 20 is outside the detection field, the sensor 14B will not detect target objects 20. In this way, the detection field will be properly defined, which is crucial to reducing false alarms.

While FIG. 4 diagrams an arrangement showing one sensor 14B, it is contemplated that the present invention may be used with more than one sensor 14B. For example, if the system had two sensors 14B, the optimization method described above would be required for each sensor.

Figure 5:
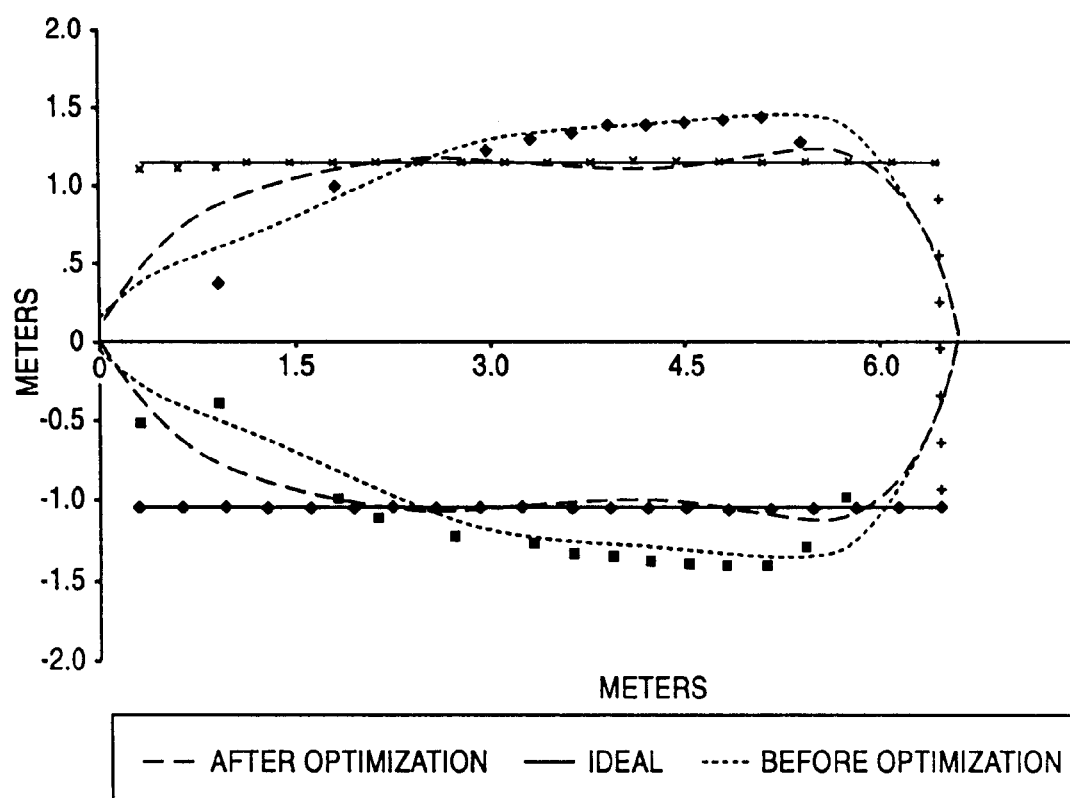
FIG. 5 is a validation chart for the method corresponding to FIG. 4.

Referring now to FIG. 5, a validation chart is shown corresponding to the method of FIG. 4, wherein the sensors 14B are calibrated as a function of low or high bin resolution with spatial constraints. The chart shows three separate graphs showing a coverage area of 6.0 meters. Target objects 20 were placed in approximately 0.3-meter increments at a distance approximately 1 meter from a center baseline (designated 0 meters on the y-axis). Under ideal conditions, as indicated by 100 on the graph, the sensors 14B would read a straight line approximately 1.0 meter left and right of the center baseline for the entire 6.0-meter coverage area. Prior to optimization, as indicated by 110 on the graph, the sensor 14B experienced significant variation from the ideal response. After optimization, as indicated by 120 on the graph, the sensor 14B response more closely resembled ideal response, as the average variation from ideal response varied less than before optimization. For example, at approximately 0.75 meters, the sensor read approximately 0.6 meters before optimization and approximately 0.8 after optimization. Also, at 4.5 meters, the sensor 14B read approximately 1.4 meters prior to optimization and approximately 1.1 after optimization.

The methods of the present invention as described in FIGS. 2, 3 and 4 provide an efficient, accurate and repeatable process for optimizing radar sensor performance. The present invention may be used on a production line, for sensor maintenance or recalibration, or for quickly and effectively administering tests for development and validation purposes.

While the invention has been described in connection with three methods, it will be understood that the invention is not limited to those methods. On the contrary, the invention covers all alternatives, modifications, and equivalents as may be included within the spirit and scope of the appended claims.

What is claimed is:

1. A method for optimizing the performance of a sensor on a vehicle radar system, the method comprising the steps of:
   defining a coverage area for the sensor, said coverage area having a width and a length comprising at least one bin, wherein each of said at least one bins defines an equal portion of said coverage area;
   placing a target object within each one of said at least one bins at a predetermined distance from the sensor; and
   regulating an integration dwell time in the sensor so that said target object is sensed by the sensor at a first position, wherein said first position is at an edge of a detection area for the sensor within one of said at least one bins.

2. The method according to claim 1, wherein the step of adjusting the sensor comprises the steps of regulating a voltage threshold of a return signal in the sensor an d of regulating an integration dwell time in the sensor so that said target object is sensed by the sensor at a first position, wherein said first position is at an edge of a detection area for the sensor within one of said at least one bins.

3. The method according to claim 1 further comprising the step of calibrating said sensor to prevent false alarms caused by a first material behind which said sensor is mounted.

4. A method for optimizing the performance of a sensor on a vehicle radar system, the method comprising the steps of:
   defining a coverage area for the sensor, said coverage area having a width and a length comprising a plurality of bins, wherein each of said plurality of bins defines an equal portion of said coverage area;
   placing a target object within every other of said plurality of bins at a predetermined distance from the sensor;
   adjusting the sensor so that one of said target objects is sensed by the sensor at a first position, said first position is at the edge of a detection area for the sensor within said one of said plurality bins;
   placing a second target object within the other of said every other of said plurality of bins at a second predetermined distance from the sensor; and
   regulating an integration dwell time in the sensor so that said target object is sensed by the sensor at a first position and said second target object is sensed by the sensor at a second position, wherein said first position is at an edge of a detection area for the sensor within one of said plurality of bins, and wherein said second position is at second edge of a second detection area for the sensor within said other of said plurality of bins.

5. The method according to claim 4, wherein the step of adjusting the sensor comprises the steps of regulating a voltage threshold of a return signal and regulating an integration dwell time in the sensor so that said target object is sensed by the sensor at a first position and said second target object is sensed by the sensor at a second position, wherein said first position is at an edge of a detection area for the sensor within one of said plurality of bins, and wherein said second position is at second edge of a second detection area for the sensor within the other of said plurality of bins.

6. The method according to claim 4 further comprising the step of calibrating said sensor to prevent false alarms caused by a first material behind which said sensor is mounted.

7. A method for optimizing the performance of a sensor on a vehicle radar system, the method comprising the steps of:
 (a) defining a coverage area for the sensor, said coverage area having a width and a length comprising a plurality of bins, wherein each of said plurality of bins defines an equal portion of said coverage area;
 (b) placing a target area within one of said plurality of bins, wherein said bin is the furthest of said plurality of bins away from the sensor;
 (c) iteratively moving a target object towards the sensor within each of said plurality of bins at a predetermined distance from the sensor;
 (d) adjusting the sensor so that the sensor at a first position senses said target object, said first position being at the edge of a detection area for the sensor within each of said plurality of bins.

8. The method according to claim 7, wherein the step of adjusting the sensor comprises the step of regulating a voltage threshold of a return signal in the sensor so that said target object is sensed by the sensor at a first position, wherein said first position being at an edge of a detection area for the sensor within one of said plurality of bins.

9. The method according to claim 7, wherein the step of adjusting the sensor comprises the step of regulating an integration dwell time in the sensor so that said target object is sensed by the sensor at a first position, wherein said first position being at an edge of a detection area for the sensor within one of said plurality of bins.

10. The method according to claim 7, wherein the step of adjusting the sensor comprises the steps of regulating a voltage threshold of a return signal in the sensor and of regulating an integration dwell time in the sensor so that said target object is sensed by the sensor at a first position, wherein said first position being at an edge of a detection area for the sensor within one of said plurality of bins.

11. The method according to claim 7 further comprising the step of calibrating said sensor to prevent detecting a first material behind which said sensor is mounted.

12. A method for optimizing the performance of a sensor on a vehicle radar system, the method comprising the steps of:
 (a) defining a coverage area for the sensor, said coverage area having a width and a length comprising a plurality of bins, wherein each of said plurality of bins defines an equal portion of said coverage area;
 (b) placing a target area within one of said plurality of bins, wherein said bin is the furthest of said plurality of bins away from the sensor;
 (c) iteratively moving the sensor towards said target object within each of said plurality of bins at a predetermined distance from the sensor;
 (d) adjusting the sensor so that the sensor at a first position senses said target object, said first position being at the edge of a detection area for the sensor within each of said plurality of bins.

13. The method according to claim 12, wherein the step of adjusting the sensor comprises the step of regulating a voltage threshold of a return signal in the sensor so that said target object is sensed by the sensor at a first position, wherein said first position being at an edge of a detection area for the sensor within one of said plurality of bins.

14. The method according to claim 12, wherein the step of adjusting the sensor comprises the step of regulating an integration dwell time in the sensor so that said target object is sensed by the sensor at a first position, wherein said first position being at an edge of a detection area for the sensor within one of said plurality of bins.

15. The method according to claim 12, wherein the step of adjusting the sensor comprises the steps of regulating a voltage threshold of a return signal in the sensor and of regulating an integration dwell time in the sensor so that said target object is sensed by the sensor at a first position, wherein said first position being at an edge of a detection area for the sensor within one of said plurality of bins.

16. The method according to claim 12 further comprising the step of calibrating said sensor to prevent detecting a first material behind which said sensor is mounted.

\* \* \* \* \*